United States Patent [19]
Zanoli et al.

[11] Patent Number: 6,077,801
[45] Date of Patent: Jun. 20, 2000

[54] REFRACTORY MATERIAL CONSISTING OF β ALUMINA

[75] Inventors: Alain Paul Bernard Zanoli; Yves Boussant-Roux, both of Avignon, France

[73] Assignee: Societe Europeenne des Produits Refractaires, Courbevoie, France

[21] Appl. No.: 09/131,365

[22] Filed: Aug. 7, 1998

[30] Foreign Application Priority Data

Aug. 8, 1997 [FR] France ............................ 97 10196

[51] Int. Cl.⁷ .......................... C04B 35/113; C04B 35/10
[52] U.S. Cl. .......................... 501/128; 501/127; 501/153; 501/154
[58] Field of Search .................. 501/127, 128, 501/153, 154

[56] References Cited

U.S. PATENT DOCUMENTS

| | | | |
|---|---|---|---|
| 2,043,029 | 6/1936 | Blau et al. | |
| 3,765,915 | 10/1973 | Duncan et al. | 501/153 |
| 3,795,723 | 3/1974 | Clendenen et al. | 501/127 |
| 4,068,048 | 1/1978 | Desplanches et al. | 501/127 |
| 4,082,826 | 4/1978 | Iijima | 501/153 |
| 4,083,919 | 4/1978 | Pearlman | 501/153 |
| 4,151,235 | 4/1979 | May et al. | 501/153 |
| 4,946,664 | 8/1990 | Van Zyl et al. | 501/153 |
| 5,028,572 | 7/1991 | Kim et al. | 501/127 |
| 5,137,853 | 8/1992 | Ichikawa et al. | 501/127 |
| 5,188,994 | 2/1993 | Ichikawa et al. | 501/127 |
| 5,733,830 | 3/1998 | Endo et al. | 501/127 |

FOREIGN PATENT DOCUMENTS

| | | |
|---|---|---|
| 2 739 617 | 4/1997 | France . |
| 455236 | 10/1936 | United Kingdom . |

*Primary Examiner*—Michael Marcheschi
*Attorney, Agent, or Firm*—Young & Thompson

[57] ABSTRACT

The invention covers a fused cast refractory material essentially consisting of β alumina and having the following chemical analysis expressed as molar percentages:

11.25% to 15.45% of at least one alkaline metal oxide selected from the group comprising $Na_2O$, $Li_2O$ and $K_2O$ provided that $Na_2O$ represents at least 9.3%, 0 to 2.97% $SiO_2$, 81.38% to 88.75% $Al_2O_3$, and at most 0.2% impurities and in which β alumina represents at least 98% of the crystallized phases.

10 Claims, 1 Drawing Sheet

REFRACTORY MATERIAL CONSISTING OF β ALUMINA

BACKGROUND OF THE INVENTION

The invention concerns a new fused cast refractory material formed of β alumina which is particularly suitable for constructing glassmaking furnace superstructures, among other applications.

Fused cast β alumina refractory materials have been known for many years. U.S. Pat. No. 2,043,029 describes materials containing alumina and 1–10% sodium oxide and indicates that approximately 5% $Na_2O$ is sufficient to obtain a material essentially formed of β alumina and that the presence of more than 1% of silica and titanium dioxide must be avoided because the latter impede the formation of β alumina. U.S. Pat. No. 2,043,029 does not specifically describe materials containing more than 5% $Na_2O$ and does not suggest that such materials can have a particular advantage.

SU-A-391 103 proposes the addition of sodium in the form of aluminate $NaAlO_2$ (1% to 15%) to prevent volatilisation of the sodium substances. This Russian patent does not specifically describe any product containing more than 7.04% $Na_2O$ and does not give any information as to the effect of the composition on the characteristics of the product.

According to patent FR-A-2739617 compression resistance can be improved by adding BaO, SrO and CaO to products with a total $NaO+K_2O$ content varying in the range 4% to 7%.

In practice, all commercially available β alumina materials, such as MONOFRAX H from Monofrax Company (U.S.A.) or Toshiba Refractories (Japan), MARSNIT® from Asahi (Japan) or JARGAL® H from the applicant have very similar analyses, namely 93% to 94.6% $Al_2O_3$, 5.2% to 7% $Na_2O$ and 0.1% to 0.3% silica and other oxides (impurities or intentional additions).

Other β alumina products are commercially available in which the amount of sodium oxide is as much as 6.7% but the content of silicon dioxide is less than 0.05%. A product sold by the applicant under reference ER.5312, known as β''' alumina, comprises 86.5% to 87.5% by weight aluminium oxide, 4.5% sodium oxide and 8% magnesium oxide, together with small amounts of other oxides, in particular around 0.30% silicon dioxide. All the above products contain virtually no corundum or a alumina (less than 34% and typically 2% maximum in JARGAL H).

β alumina materials have a high resistance to thermal shock and to mechanical stresses at high temperature. These properties make them suitable for use in superstructures in the melting chamber of glassmaking furnaces. However, β alumina materials are somewhat fragile. Accordingly, machining and cutting cast blocks are difficult and costly because of wastage. Also, the various handling operations that the blocks undergo during manufacture and during assembly of the furnace can cause nicks in edges and damage corners. Even a highly localised absence of material in a superstructure block can lead to the risk of accelerated corrosion of the material associated with the presence of deposits of corrosive materials emanating from the glass or simply from an increase in the corrosion surface area of the block.

Moreover, damage to the blocks during manufacture increases the cost of the product by reducing the yield. This problem limits design solutions because superstructures generally require parts with very clearly defined edges to a greater extent than in other applications.

Moreover, the trend in glass melting techniques is towards more severe conditions in which the materials of the furnace are more stressed and this applies in particular to the development of oxy-gas combustion.

Because of the requirement for integrity of structures, more pressing than in the past, in particular at the level of the joints, and to contribute to the current evolution in superstructure geometry, there is a need for fused cast products consisting principally of β alumina having improved mechanical properties.

SUMMARY OF THE INVENTION

The aim of the invention is therefore to provide a new β alumina product that is less fragile but retains the properties of resistance to thermal shock and to mechanical stresses at high temperature of current β alumina materials.

We have additionally found that the modifications made to reduce fragility also enable us to obtain a product that is less sensitive to moisture uptake and whose reactivity in contact with AZS and siliceous materials and in contact with flying ash consisting principally of silica is improved.

More particularly, the present invention concerns a new fused cast refractory material essentially consisting of β alumina characterised in that it has the following chemical analysis expressed as molar percentages:

- 11.25% to 15.45% of at least one alkaline metal oxide selected from the group comprising $Na_2O$, $Li_2O$ and $K_2O$ provided that $Na_2O$ represents at least 9.3%,
- 0 to 2.97% $SiO_2$,
- 81.38% to 88.75% $Al_2O_3$, and at most 0.2% impurities and in which β alumina represents at least 98% of the crystallized phases.

DESCRIPTION OF THE INVENTION

The alkaline metal oxide is preferably essentially in the form of $Na_2O$ and the chemical analysis of the material expressed as weight percentages is preferably as follows:

- 7.25% to 10% $Na_2O$,
- 0 to 1.85% $SiO_2$,
- 87.95% to 92.75% $Al_2O_3$, and at most 0.2% impurities.

The chemical analysis of the material expressed as weight percentages is preferably also as follows:

- 7.3% to 8.8% $Na_2O$,
- 0.4% to 1.65% $SiO_2$,
- 89.85% to 92.3% $Al_2O_3$, and at most 0.2% impurities.

The chemical analysis of the material expressed as weight percentages is most preferably as follows:

- 7.4% to 8.5% $Na_2O$,
- 0.7% to 1.45% $SiO_2$,
- 89.85% to 91.9% $Al_2O_3$, and at most 0.2% impurities.

The impurities, which are not introduced intentionally, come from the raw materials and are principally in the form of oxides of Fe and Ti.

Surprisingly, it has been found that increasing the content of sodium oxide above a threshold value of 7.25% gives these new β alumina products improved properties without degrading the well-known fundamental properties of this type of product.

Trials have shown that in practice the maximal $Na_2O$ content must be limited to approximately 10%. Above 10% the sagging under load temperature is significantly reduced.

Similarly, the Na$_2$O content must not fall below 7.25% if materials having significantly improved mechanical properties are to be obtained.

We have shown further the interest of products in which Na$_2$O is partially replaced with an equivalent molar quantity of Li$_2$O or K$_2$O.

It is thought that these improvements are linked on the one hand to reduced intergranular porosity and on the other hand to mechanical strengthening of the β alumina grain associated with a change to the crystallography of the β alumina.

In the present context, β alumina means substances from the Al$_2$O$_3$—Na$_2$O system in which Na$_2$O can be replaced by another alkaline or alkaline-earth oxide.

New fused cast β alumina materials of the invention can be produced in the conventional way by melting the raw materials in the appropriate proportions and then casting the molten mixture either in bulk to obtain a granular product that can be agglomerated by pressing or used as a principal ingredient of a concrete or a mortar or in moulds to obtain shaped parts directly. The materials are often called "electrocast" materials because melting is usually carried out in an electric arc furnace. The expression "fused cast" is to be understood as encompassing this latter term.

Various industrial format parts were prepared by casting into graphite moulds molten mixtures of Al$_2$O$_3$, Na$_2$O and SiO$_2$ using either a 600 kVA single-phase laboratory arc furnace or a 3000 kVA three-phase industrial arc furnace using the "arc" fusion technique disclosed in French patent 1 208 577.

The chemical analysis of the materials in terms of Na$_2$O and SiO$_2$ is set out in table 1, the remainder of the composition consisting of Al$_2$O$_3$ and impurities (less than 0.2%). Material No 5 is a reference material outside the scope of the invention, namely a commercially available β alumina material.

Table 3 gives the compositions of the products in which Na$_2$O is partially replaced by an equivalent molar quantity of Li$_2$O or K$_2$O.

DETAILED DESCRIPTION OF THE DRAWINGS

The following description, given with reference to the accompanying graphs, clearly explains the invention.

TABLE 1

Figure 1:
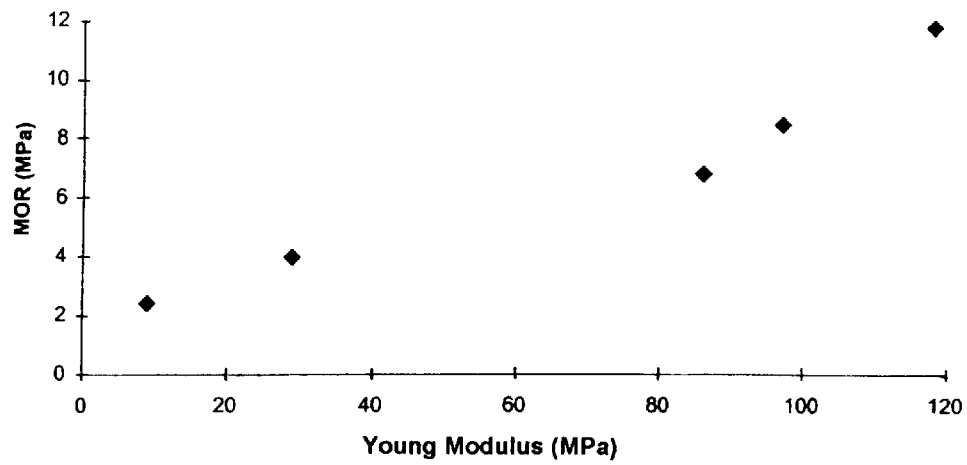
FIG. 1 is a graph showing the correlation between the Young's modulus and the MOR of various products.

| No | Na$_2$O (wt %) | SiO$_2$ (wt %) | Young's modulus (GPa) |
|---|---|---|---|
| 1* | 6.09 | 0.02 | 7 |
| 2* | 6.39 | 0.02 | 4 |
| 3* | 6.55 | 0.72 | 11 |
| 4* | 6.56 | 0.10 | 9 |
| 5** | 6.76 | 0.03 | 15 |
| 6* | 6.93 | 0.46 | 29 |
| 7* | 6.95 | 0.80 | 43 |
| 8* | 6.96 | 0.40 | 34 |
| 9* | 7.04 | 0.79 | 43 |
| 10* | 7.08 | 0.04 | 25 |
| 11* | 7.08 | 0.04 | 79 |
| 12* | 7.09 | 0.04 | 70 |
| 13* | 7.09 | 0.04 | 4 |
| 14* | 7.12 | 0.85 | 28 |
| 15* | 7.24 | 0.84 | 40 |
| 16 | 7.25 | 0.03 | 92 |
| 17 | 7.25 | 0.03 | 86 |
| 18 | 7.26 | 0.41 | 97 |
| 19 | 7.26 | 0.41 | 86 |
| 20 | 7.28 | 0.02 | 79 |
| 21 | 7.28 | 0.02 | 69 |
| 22 | 7.31 | 0.03 | 108 |
| 23 | 7.34 | 0.78 | 100 |
| 24 | 7.36 | 0.81 | 106 |
| 25 | 7.43 | 0.68 | 110 |
| 26 | 7.45 | 0.8 | 118 |
| 27 | 7.54 | 0.78 | 128 |
| 28 | 7.54 | 0.78 | 133 |
| 29 | 7.57 | 0.77 | 132 |
| 30 | 7.67 | 0.64 | 123 |
| 31 | 7.86 | 0.77 | 122 |
| 32 | 7.87 | 0.73 | 121 |
| 33 | 7.88 | 0.05 | 127 |
| 34 | 7.89 | 0.78 | 130 |
| 35 | 7.89 | 0.78 | 118 |
| 36 | 8.02 | 0.05 | 105 |
| 37 | 8.05 | 0.78 | 104 |
| 38 | 8.08 | 0.47 | 111 |
| 39 | 8.16 | 0.51 | 128 |
| 40 | 8.20 | 0.10 | 129 |
| 41 | 8.22 | 0.79 | 121 |
| 42 | 8.27 | 0.81 | 146 |
| 43 | 8.29 | 0.54 | 138 |
| 44 | 8.45 | 0.78 | 137 |
| 45 | 8.52 | 0.77 | 140 |
| 46 | 8.90 | 0.81 | 125 |
| 47 | 9.03 | 0.86 | 150 |
| 48 | 9.15 | 0.10 | 124 |
| 49* | 9.52 | 1.99 | 87 |
| 50 | 9.67 | 1.67 | 107 |
| 51 | 9.92 | 0.10 | 108 |
| 52 | 9.97 | 0.45 | 103 |
| 53* | 10.00 | 2.00 | 85 |
| 54* | 10.19 | 0.82 | 118 |
| 55* | 10.29 | 0.80 | 118 |
| 56* | 10.79 | 0.40 | 95 |
| 57* | 11.26 | 0.43 | 93 |
| 55* | 13.77 | 0.44 | 96 |
| 59* | 15.63 | 0.45 | 71 |

*material outside the scope of the invention
**reference material outside the scope of the invention

* material outside the scope of the invention
** reference material outside the scope of the invention The various improvements of properties characteristic of the materials of the invention will now be reviewed with an attempt to explain the reasons for them. It goes without saying, however, that the applicant does not intend to link the invention to any particular theory and that the explanations given are merely indicative.

A) Reduced Fragility

Starting with the problem of the fragility of the blocks during machining and various handling operations, we investigated which physical characteristic would enable us best to characterise this phenomenon and in particular to measure the effects of changing the chemical composition.

The skilled person is well aware that the important specification for products used in the vaults of glass melting furnaces is creep resistance. We show below that this property is retained by the products of the invention but that it does not correspond to the problem of the fragility of edges and corners. Moreover, compressive strength is of no particular relevance to characterising the materials in this context. To the contrary, we know that the characteristic indicating the potential of a material to fracture at edges and corners is its bending strength.

The modulus of rupture (MOR) is the rupture stress in three-point bending of test pieces with dimensions of 25×25×150 mm. The modulus of elasticity (Young's modulus) is a dynamic modulus measured by the resonant frequency of propagation of transverse waves in the same test pieces. The MOR and the Young's modulus are related by the following equation derived from the Griffith Irwin Orowan analysis: $MOR=(E\gamma/4c)^{1/2}$ where E is the Young's modulus, $\gamma$ the surface energy and 2c the length of the principal dimension of the defect. As shown by a few points set out in table 2, we have verified that there is a good correlation between the MOR and the Young's modulus.

TABLE 2

| No | $Na_2O$ (wt %) | $SiO_2$ (wt %) | Young's modulus (GPa) | MOR (MPa) |
|---|---|---|---|---|
| 4* | 6.56 | 0.10 | 9 | 2.4 |
| 6* | 6.93 | 0.46 | 29 | 4.0 |
| 18 | 7.26 | 0.41 | 97 | 8.6 |
| 19 | 7.26 | 0.41 | 86 | 6.9 |
| 26 | 7.45 | 0.80 | 118 | 11.9 | through 13* show that in this transition area the results are erratic. In contrast, from 7.25% sodium oxide the improvement is a real one and the results are reproducible (examples 16 through 21). For this reason we shall adopt the value of 7.25% sodium oxide as the limit from which the mechanical properties of the products are significantly improved.

This curve also shows that the silica content does not have a significant effect on the evolution of the mechanical properties of the products. The silica contents of the products tested varied from 0 to 2%.

We also produced a number of products in which $Na_2O$ was partially replaced by $Li_2O$ and $K_2O$. The products identified previously as being within the scope of the invention have a molar percentage of sodium oxide that can vary in the range 11.25% to 15.45%. We worked within this range to verify that if the sum of the molar percentages of $Na_2O+Li_2O+K_2O$ is in the range 11.25% to 15.45% the products obtained have improved mechanical properties. The results are set out in table 3 which shows the compositions of the products in weight and molar percentages; in both cases the remainder is alumina.

TABLE 3

| No. | Weight percentages | | | | Molar percentages | | | | Young's modulus (GPa) |
|---|---|---|---|---|---|---|---|---|---|
| | $Na_2O$ | $SiO_2$ | $Li_2O$ | $K_2O$ | $Na_2O$ | $Li_2O$ | $K_2O$ | $Na_2O + Li_2O + K_2O$ | |
| 5** | 6.76 | 0.03 | 0 | 0 | 10.65 | 0 | 0 | 10.65 | 15 |
| 22 | 7.31 | 0.03 | 0 | 0 | 11.48 | 0 | 0 | 11.48 | 108 |
| 40 | 8.20 | 0.10 | 0 | 0 | 12.80 | 0 | 0 | 12.80 | 129 |
| 60 | 6.35 | 0.05 | 0.50 | 0 | 9.93 | 1.62 | 0 | 11.55 | 122 |
| 61 | 6.36 | 0.05 | 1.17 | 0 | 9.78 | 3.73 | 0 | 13.51 | 112 |
| 62 | 6.97 | 0.01 | 1.10 | 0 | 10.70 | 3.50 | 0 | 14.20 | 147 |
| 63 | 6.99 | 0.01 | 1.12 | 0 | 10.73 | 3.57 | 0 | 14.30 | 129 |
| 64 | 7.98 | 0.01 | 0.92 | 0 | 12.24 | 2.93 | 0 | 15.17 | 109 |
| 65 | 6.57 | 0.05 | 0 | 1.05 | 10.35 | 0 | 1.09 | 11.44 | 117 |
| 66 | 6.36 | 0.05 | 0 | 0.50 | 9.93 | 0 | 1.62 | 11.55 | 113 |
| 67 | 6.90 | 0.05 | 0 | 1.05 | 10.85 | 0 | 1.09 | 11.94 | 123 |
| 68 | 7.20 | 0.03 | 0 | 1.20 | 11.31 | 0 | 1.24 | 12.55 | 129 |
| 69 | 7.60 | 0.05 | 0 | 1.05 | 11.90 | 0 | 1.08 | 12.98 | 131 |
| 70 | 8.20 | 0.01 | 0 | 1.24 | 12.80 | 0 | 1.28 | 14.08 | 125 |

FIG. 1 shows that the two parameters are closely correlated and that the bending behaviour of products can therefore be assessed by measuring their Young's modulus or their MOR.

Because it is easier to measure the Young's modulus, we have chosen this parameter to illustrate the mechanical characteristics of the various products.

Figure 2:
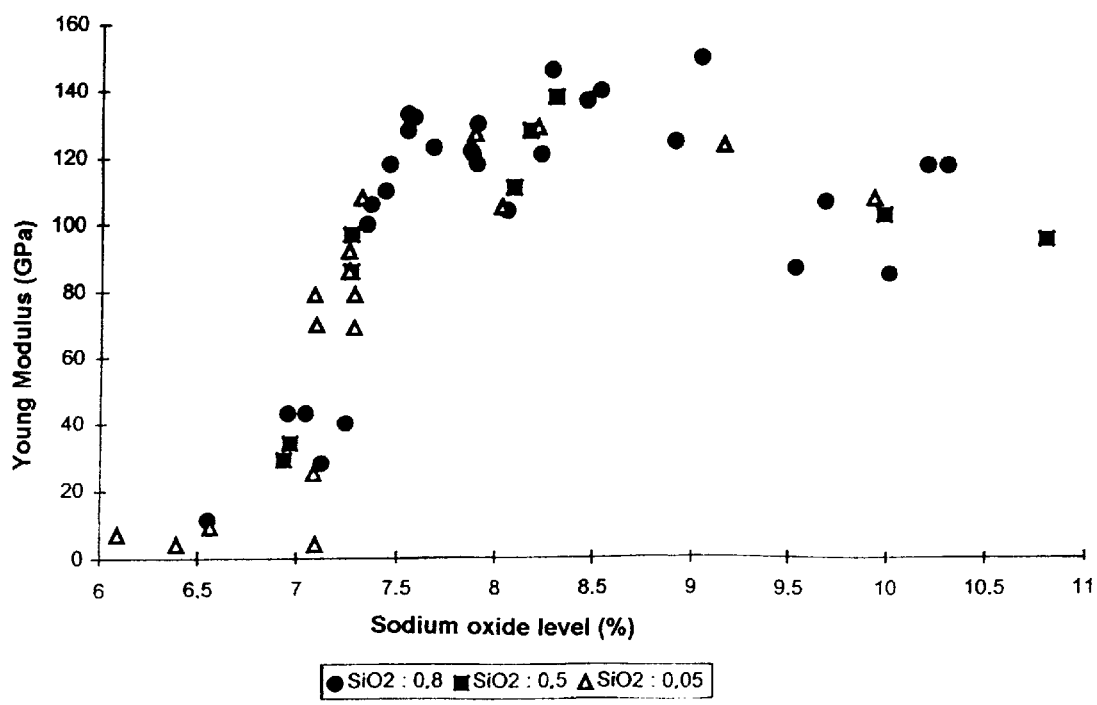
FIG. 2 is a graph showing the variation in the mechanical properties as a function of the composition of the material.

Table 1 sets out the Young's modulus values for all the products that we made and FIG. 2 shows the evolution of the Young's modulus for varying contents of silica and sodium oxide. Each point represents the average of six measurements corresponding to six samples taken from the same block.

The curve shows that from approximately 7.5% $Na_2O$ the Young's modulus is increased by a factor of at least 5 over reference material No 5. The improvement in mechanical properties is significant from a sodium oxide content greater than or equal to 7.25%.

Note that as soon as the sodium oxide content reaches 7% the results obtained may be correct but examples 10*

Note that substituting $Li_2O$ or $K_2O$ for some of the $Na_2O$ yields products that are within the scope of the invention provided that the sum of the molar percentages of $Na_2O+Li_2O+K_2O$ is in the range 11.25% to 15.45%. Note that the products with less than 6% by weight $Na_2O$ were not studied because they are of no economic interest.

On the practical plane, note an improvement over products having the prior art compositions. This improvement is reflected in reduced sensitivity of the product to nicking of the edges and breaking of the corners routinely occurring on removal from the mould, after sawing or during manipulation of the blocks (building of furnaces). Moreover, the products of the invention generally have a better external appearance.

To summarize, a sufficient quantity of sodium oxide possibly accompanied by lithium oxide or potassium oxide makes the material less fragile.

B) Reduced deterioration by water

It is important to know how β alumina products behave when exposed to moisture. When exposed to conditions of high humidity, such as those encountered in long-term outdoor storage, β alumina materials tend to lose their mechanical cohesion, this deterioration possibly going as far as complete disintegration of the product. Similarly, the cements used in building the furnaces require the use of water which can weaken the materials with which we are concerned here when it evaporates.

To highlight the effect of the new composition on deterioration by water, we immersed samples (180×180×180 mm) taken from near the surface of the blocks in water at room temperature. Changes in the mechanical properties of the material were studied by measuring the Young's modulus. We carried out these tests on products outside the scope of the invention (with around 7% $Na_2O$) and products in accordance with the invention (approximately 8% $Na_2O$) with various percentages of silica. Table 4 summarizes the results.

TABLE 4

| No | $Na_2O$ (%) | $SiO_2$ (%) | Young's modulus before test (GPa) | Young's modulus after 24 h in water (GPa) (percentage loss) | Young's modulus after 68 h in water (GPa) (percentage loss) |
|---|---|---|---|---|---|
| 6* | 6.93 | 0.46 | 29 | 11 (62%) | 6 (73.3%) |
| 7* | 6.95 | 0.80 | 43 | 41 (4.6%) | 29 (32.6%) |
| 10* | 7.08 | 0.04 | 25 | 22 (12%) | 12 (52%) |
| 36 | 8.02 | 0.05 | 105 | 96 (8.6%) | 60 (42.8%) |
| 37 | 8.05 | 0.78 | 104 | 102 (1.9%) | 94 (9.6%) |
| 39 | 8.16 | 0.51 | 128 | 115 (10.1%) | 100 (21.9%) |

A significant reduction in Young's modulus indicates that the moisture had affected the grain boundaries and the β alumina grain itself and must be considered as symptomatic of degradation of the material.

Note that with the materials in accordance with the invention correct values were obtained for Young's modulus after prolonged hydration and that for any silica content. This is due to the initially higher values but also to a lower percentage loss. Note however that for relatively high silica contents the deterioration of the material is significantly reduced. Increasing the silica content therefore significantly improves the resistance of the blocks to hydration.

C) Reduced Reactivity to AZS and Flying Silica Ash

In the construction of glassmaking furnace superstructures, the β alumina product is initially in contact with AZS type products because in most cases the area on the upstream side of the furnace is made of AZS type products. Furthermore, the β alumina products are generally overlaid with silica refractory materials, in particular those constituting the vault of the melting chamber of the furnaces. When attacked, these refractory materials can give rise to silica-rich runs which can come into contact with the β alumina product.

Industrial experience and laboratory tests show that a reaction occurs if these various materials are in contact with each other at high temperatures: the constituents of the AZS and the silica penetrate the β alumina product leading to local disintegration of the product associated with yellowish coloration due to the penetration of zirconia.

Various products were tested for their behaviour in an atmosphere containing sodium at 1 550° C. The material tested was used as the lid of a crucible made from ER1711 (the applicant's AZS product) containing molten sodium sulphate at 1 100° C. The entire device was heated to 1 550° C. for 72 hours. A sample taken in exactly the same way from the center of all the materials tested was then subject to particular characterizing tests.

To compare the behaviour of one material to another we compared the sodium oxide and silica contents in the various products analysed. The analysis provides an estimate of the potential resistance of the product to diffusion of these elements from the crucible into the β alumina material. The results are set out in table 5.

TABLE 5

| No | $Na_2O$ before test (%) | $Na_2O$ after test (%) | Change in $Na_2O$ (%) | $SiO_2$ before test (%) | $SiO_2$ after test (%) | Increase in $SiO_2$ (%) |
|---|---|---|---|---|---|---|
| 1* | 6.09 | 7.48 | +23 | 0.02 | 0.34 | 1600 |
| 26 | 7.45 | 7.36 | −1 | 0.80 | 0.80 | 0 |
| 30 | 7.67 | 8.17 | +6 | 0.64 | 0.64 | 0 |
| 40 | 8.20 | 7.79 | −5 | 0.10 | 0.20 | 100 |
| 51 | 9.92 | 9.36 | −3 | 0.10 | 0.22 | 120 |

The products with the invention, regardless of the silica content, therefore show satisfactory behaviour in an atmosphere containing sodium and are less sensitive to diffusion of sodium oxide and silica. In particular, introducing silica into the material reduces the concentration gradient between the material tested and the AZS crucible and there is therefore less penetration of silica.

Also, reducing the reactivity of the β alumina products relative to silica provides a β alumina base material that is significantly less sensitive to flying silica ash. For some types of glass it can be highly beneficial to reduce the proportion of AZS materials in the vicinity of the batch material burden to the benefit of materials consisting of β alumina. This can reduce defects resulting from vapour phase corrosion of AZS products.

D) Conservation of Properties of β Alumina Products

We verified that the products of the invention conserve the well-known properties of β alumina products: resistance to thermal shock and to mechanical stresses at high temperature. To do this we carried out various types of tests on prior art products as well as on products in accordance with the invention.

To study the resistance of the products to thermal shock we subjected samples (25×25×75 mm) of the products tested to 25 identical thermal cycles: 15 minutes in a furnace at 1 200° C. followed by 15 minutes at room temperature.

We also subjected the samples to wall fracture tests. In this test the larger face of the samples (50×50×100 mm) is subjected to a heat cycle (one hour at 900° C. then one hour at 1 500° C.) with the other face exposed to air at room temperature. In addition to thermal cycling on the hot side, the product is therefore subjected to a temperature gradient. The thermal conditions of this test simulate the situation in which the blocks are placed within the superstructure of a glassmaking furnace since, in most cases, β alumina products are used in the area of the burners and are therefore subjected to variations of temperature on the hot face in relation to the alternating passage of combustion flue gases leaving the furnace and combustion-supporting air entering it from the regenerators.

Both these tests showed similar behaviour of all the products, regardless of the sodium oxide and/or silica content.

To evaluate resistance to mechanical stresses at high temperatures we used sagging under load and creep tests.

In a glassmaking furnace, the superstructure blocks are subjected to mechanical loads at high temperature. Sometimes, especially if the blocks are assembled into arches or vaults, the compression forces are high enough for there to be a risk of creep.

It is necessary to verify that resistance to mechanical stresses at high temperature is not affected by increasing the content of sodium oxide with various silica contents.

In the sagging under load test a compression stress of 2 kg/cm$^2$ is applied to samples (diameter 50 mm, height 50 mm) of the product to be tested and the temperature at which the material sags is recorded. The results are set out in table 6.

TABLE 6

| No | Na$_2$O (%) | SiO$_2$ (%) | Sagging temperature (° C.) |
|---|---|---|---|
| 43 | 8.29 | 0.54 | >1700 |
| 49* | 9.52 | 1.99 | 1620 |
| 52 | 9.97 | 0.45 | >1700 |
| 53* | 10.00 | 2.00 | 1600 |
| 56* | 10.79 | 0.40 | 1630 |
| 58* | 13.77 | 0.44 | 1600 |

We found that the sagging temperature was above 1 630° C. for the products of the invention and for the prior art products. It is only with sodium oxide contents above 10% that a reduction in the sagging temperature is seen. We therefore set a sodium oxide content limit of 10%. Similarly, a reduction in the sagging temperature was noted for silica contents higher than 1.9% (examples 49* and 53*). This is related to the increase in the volume of the silica-containing phase and for this reason the products of the invention must not contain more than 1.85% silica.

To evaluate creep resistance a load of 5 kg/cm$^2$ was applied to samples (diameter 50 mm, height 50 mm) of the products to be studied and the rate of creep of the material was measured for 100 hours at a temperature of 1 550° C.

The test temperature was chosen to simulate the behaviour of the products in an industrial situation and was the most severe that can be encountered from the mechanical point of view: the stress of 5 kg/cm$^2$ corresponds to a vault with a span of 5 m and an angle of 60°.

The tests did not detect any difference between the behaviour of the new products and that of the prior art products.

E) Comments on the Mechanisms of Improvement of β Alumina Products

Crystallographic and microscopic studies using X-ray diffraction and a microprobe showed that adding sodium oxide in the proportions indicated to β alumina materials had the following consequences:

it reduced porosity,
the microstructure was changed: there was an interstitial phase serving as a cement between the β alumina grains, an increase in the sodium oxide content of the β alumina grains (NaAl$_{11}$O$_{17}$) and the appearance of a β alumina phase very rich in sodium oxide called β' alumina (NaAl$_7$O$_{11}$).

Table 7 shows the change in porosity for various types of β alumina product:

TABLE 7

| No | Na$_2$O (%) | SiO$_2$ (%) | Porosity (%) |
|---|---|---|---|
| 4* | 6.56 | 0.10 | 20.9 |
| 32 | 7.87 | 0.73 | 4.5 |
| 40 | 8.2 | 0.10 | 7.5 |

Note that the products of the invention were less porous. Clearly the reduced intergranular porosity is one factor in the mechanical strengthening of the product by enabling closer contact of the β alumina grains. Propagation of a crack along the grain boundaries when the material is under load tends to be favoured by the presence of pores between the β alumina grains.

The effect of increasing the sodium oxide content on the microstructure of the β alumina products was studied using a microprobe and X-ray diffraction. In particular, we studied the effect of adding sodium oxide in the presence and in the absence of silica.

Measurements obtained by means of the microprobe indicated the mean content of sodium oxide in the β alumina grains. This study enabled us to show that adding sodium oxide in the presence or absence of silica enriches the β alumina grains with sodium oxide as compared to materials outside the scope of the invention.

Table 8 shows that if the sodium oxide content is greater than 7.25% a β alumina phase richer in sodium oxide appears that can be detected by X-ray diffraction. This is the β alumina phase NaAl$_7$O$_{11}$. Table 8 also shows that if the sodium oxide content is increased some of the surplus sodium oxide contributes to enriching the β alumina grains as previously indicated and also contributes to the formation of an interstitial phase.

TABLE 8

| No | Na$_2$O (%) | SiO$_2$ (%) | Interstitial phase | β' alumina |
|---|---|---|---|---|
| 1* | 6.09 | 0.02 | no | no |
| 3* | 6.55 | 0.72 | Na$_2$O, Al$_2$O$_3$, SiO$_2$ | no |
| 25 | 7.43 | 0.68 | Na$_2$O, Al$_2$O$_3$, SiO$_2$ | yes |
| 29 | 7.57 | 0.76 | Na$_2$O, Al$_2$O$_3$, SiO$_2$ | yes |
| 40 | 8.20 | 0.10 | NaAlO$_2$ | yes |

The nature of the interstitial phase depends on the silica content. In the presence of silica the substance formed at the periphery of the β alumina grains is a silica-sodium-alumina substance of the Na$_2$O, Al$_2$O$_3$, SiO$_2$ type. The content of this substance increases with the content of Na$_2$O in the product. In the absence of silica there is a sodium aluminate NaAlO$_2$ type interstitial phase. The content of this substance increases with the Na$_2$O content of the product.

The presence of these two types of interstitial phase in sufficient proportions can contribute to strengthening the cohesion of the grains.

In conclusion, it can be said that the tests carried out show that the new products conserve the fundamental properties of β alumina products whilst making very significant improvements thereto.

Note that although the present invention has been specifically described in relation to fused cast materials formed by moulding, it also encompasses granular products, whether agglomerated or not, obtained from said materials by grinding or crushing or by any other means.

What is claimed is:

1. A fused cast refractory material having the following chemical analysis expressed as molar percentages:
   11.25% to 15.45% of at least one alkali metal oxide selected from the group consisting of $Na_2O$, $Li_2O$ and $K_2O$ provided that $Na_2O$ represents at least 9.3%,
   0.64 to 2.97% $SiO_2$,
   81.38% to 88.75% $Al_2O_3$, and
   at most 0.2% impurities,
   said material consisting essentially of grains and of an interstitial $Na_2O$—$Al_2O_3$—$SiO_2$ phase binding said grains, at least 98% of said grains being β-alumina grains.

2. A material according to claim 1 wherein the alkali metal oxide consists essentially of $Na_2O$.

3. A material according to claim 2, wherein the chemical analysis of the material expressed as weight percentages is as follows:
   7.25% to 10% $Na_2O$,
   0.4 to 1.85% $SiO_2$,
   87.95% to 92.75% $Al_2O_3$, and
   at most 0.2% impurities,
   wherein said grains further comprise β'-alumina phase grains.

4. A material according to claim 3 wherein the chemical analysis of the material expressed as weight percentages is as follows:
   7.3% to 8.8% $Na_2O$,
   0.4% to 1.65% $SiO_2$,
   89.35% to 92.3% $Al_2O_3$, and
   at most 0.2% impurities.

5. A material according to claim 4 wherein the chemical analysis of the material expressed as weight percentages is as follows:
   7.4% to 8.5% $Na_2O$,
   0.7% to 1.45% $SiO_2$,
   89.85% to 91.9% $Al_2O_3$, and
   at most 0.2% impurities.

6. A block of a fused cast refractory material having the following chemical analysis expressed as molar percentages:
   11.25% to 15.45% of at least one alkali metal oxide selected from the group consisting of $Na_2O$, $Li_2O$ and $K_2O$ provided that $Na_2O$ represents at least 9.3%,
   0.64 to 2.97% $SiO_2$,
   81.38% to 88.75% $Al_2O_3$, and
   at most 0.2% impurities,
   said material consisting essentially of grains and of an interstitial $Na_2O$—$Al_2O_3$—$SiO_2$ phase binding said grains, at least 98% of said grains being β-alumina grains.

7. A block according to claim 6 wherein the alkali metal oxide consists essentially of $Na_2O$.

8. A block according to claim 7, wherein the chemical analysis of the material expressed as weight percentages is as follows:
   7.25% to 10% $Na_2O$,
   0.4 to 1.85% $SiO_2$,
   87.95% to 92.75% $Al_2O_3$, and
   at most 0.2% impurities,
   wherein said grains further comprise β'-alumina phase grains.

9. A block according to claim 8 wherein the chemical analysis of the material expressed as weight percentages is as follows:
   7.3% to 8.8% $Na_2O$,
   0.4% to 1.65% $SiO_2$,
   89.35% to 92.3% $Al_2O_3$, and
   at most 0.2% impurities.

10. A block according to claim 9 wherein the chemical analysis of the material expressed as weight percentages is as follows:
    7.4% to 8.5% $Na_2O$,
    0.7% to 1.45% $SiO_2$,
    89.85% to 91.9% $Al_2O_3$, and
    at most 0.2% impurities.

* * * * *